March 25, 1969
K. FELGNER
3,434,453
INDICATING DEVICE
Filed Sept. 12, 1966
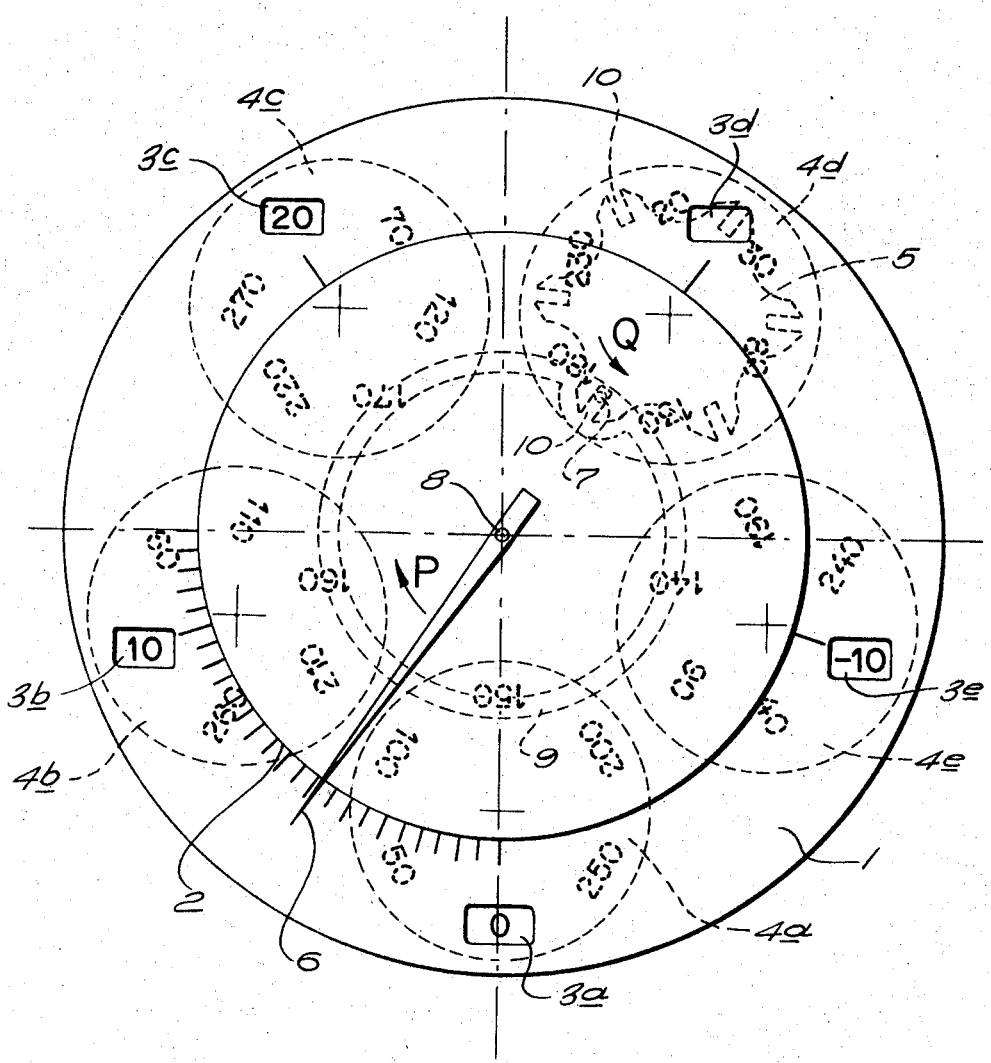
INVENTOR.
KARL FELGNER
BY
Thomson & Mrose
ATTORNEYS United States Patent Office 3,434,453
Patented Mar. 25, 1969

3,434,453
INDICATING DEVICE
Karl Felgner, Darmstadt, Germany, assignor to Hottinger Baldwin Mesztechnik G.m.b.H., Darmstadt, Germany, a corporation of Germany
Filed Sept. 12, 1966, Ser. No. 578,589
Claims priority, application Germany, Sept. 18, 1965, H 57,216
Int. Cl. G09f 9/00
U.S. Cl. 116—129                    3 Claims

ABSTRACT OF THE DISCLOSURE

A catch diametrically opposite the tip of a pointer of an indicating device rotates with the pointer into successive driving engagements with angularly-arrayed intermittent-motion star wheels; angularly-arrayed dials disposed behind apertures of a stationary graduated dial plate are turned by the star wheels to expose numerals which correctly characterize scale values during each of successive rotations of the pointer.

---

This invention concerns an indicating device with a moveable pointer which ranges over a circular dial. The scale markings of the dial change in conjunction with the movement of the pointer, the numbers becoming visible through openings in the disk.

It is well known that circular dials may be employed to accommodate extended scales in relatively restricted space by allowing the needle to rotate more than once. Because a pointer position may then no longer have a unique meaning, it is necessary to provide means for an unambiguous reading. In the simplest case the scale marking remains constant, while an amount corresponding to the number of rotations of the pointer must be added to the value shown in order to obtain the correct value. However, such contrivances are not only awkward to read, but may lead to erroneous results, inasmuch as a constant may be omitted by oversight or an error made in the necessary calculation. To counteract this, arrangements with multiple scale markings have been developed. It is then up to the user to select the appropriate scale, sometimes aided by an indication of the number of pointer rotations.

In practice, it has proven necessary to eliminate subjective sources of error as much as possible in order to obtain exact scale readings. Therefore, arrangements have been proposed with multiple scale markings for which only the portion relevant to the pointer is visible. This is accomplished either by the use of one or several variable openings over the dial, controlled by the pointer rotation, or by displacing the entire scale behind one or more windows. Where the displacement takes place as a continuous function of the pointer movement, the scale markings can be read exactly only in a small region in the neighborhood of the current pointer location. Outside of this region, the markings are partially or entirely obscured, or displaced with respect to the window. In an alternate version, the displacement occurs discontinuously at the end of each pointer rotation. In this case, the scale relevant to the particular pointer rotation is visible in its entirety; however, a region of uncertainty at the point of transition to the next pointer excursion cannot be avoided. In addition, a fluctuation of the pointer at the point of transition will result in the continuous switching back and forth of the dial readings. Thus this version does not incure a more complete accuracy than that of the others.

State-of-the-art devices have the following further disadvantages: additional expenditures are incurred in using an arrangement where the scale markings are almost completely covered by a movable opening, or by a device which carries the entire dial marking, because of the relatively large mass which has to be moved; a discontinuous change of scale necessitates the use of external power when accurate and reaction-free displacements are to be guaranteed. Furthermore, with the known method of continuously displacing the entire dial marking by obscuring the irrelevant parts of it, whether this is done by covering it with the shutter or by moving the dial itself, the displacement has to be vertical. This is necessary because a strictly horizontal displacement or the rotation of the entire dial occasionally results in uncovering only a portion of the relevant numbers, which can be a source of errors. However, the vertical displacement of the dial or the shutter causes an increased feedback on the system, or else an expensive compensatory mechaninsm is required and the space requirements would be enlarged.

The purpose of this invention is to create an inexpensive indicating device, easy to read and capable of being read exactly free of regions of uncertainty, while avoiding as much as possible the disadvantages of previously disclosed devices. This is accomplished as follows: in accordance with this invention, numbered dials, which may each be independently moved, are located behind numeral openings for the scale in a dial plate, so that the different numerals or other symbols may be caused to appear in the openings as required. The individual numbered dials may be adjusted independently of one another, by means of a switching device rotating with the pointer and preferably displaced by a given angle with respect to the pointer. The device is preferably arranged so that only the major scale numerals, such as tens, are switched or stepped as a function of the pointer rotation, while the other scale markings, which may be indicated solely by means of graduating lines or by unchanging numbers, remain visible at all times. The subdivision of the entire scale-changing mechanism into a number of dials leads to small dimensions of the single dials. Hence, their spatial arrangement is simplified. Because of their moderate mass, each of the small dials may be moved by the mechanical drive mechanism without excessive mechanical feedback and without recourse to external power. The angular displacement of the switching device with respect to the pointer, in a preferred embodiment, results in switching action minimizing the uncertainty which could be present when the scale is changed as the pointer crosses between two different scale zones. An especially favorable configuration is accomplished by displacing the switching arrangement by 180° with respect to the pointer; in this manner, the entire dial marking, with the exception of the number opposed to the pointer, corresponds exactly to the marking of the scale currently in use. The switching device is preferably coupled to the pointer rigidly.

In one suitable form of this invention, each numbered dial is furnished with a star wheel arrangement having Maltese cross design features. This star wheel is intermittently stepped or switched by pointer-attached switching device so that the markings appearing in the apertures may be made to change almost instantaneously.

The details of a preferred practice of the invention may be understood from the following description of the apparatus illustrated in the accompanying drawing.

In the example chosen to illustrate the invention, the circular dial plate 1 is furnished with scale line markings or graduations 2. These scale graduations extend over 360° but are only shown in part for the sake of clarity. In registration with the markings for the main scale numerals (in the example, the tens markings) are apertures 3a to 3e, and behind these apertures are arranged circular dials 4a to 4e, which may be individually rotated. Scale markings lying between the dial apertures 3 may also be furnished with fixed markings (in the example, with numbers such as 1 to 9).

Each of the dials 4 is connected with a Maltese cross type of intermittent-motion star wheel 5 which has a number of teeth corresponding to the number of markings on that particular dial. The Maltese cross star wheel arrangement 5 is driven by the cooperating intermittent-drive member 7 synchronously coupled with the pointer 6 and displaced with respect to the pointer by approximately 180°. In the illustrated example, pawl-type intermittent dial-switching member 7 is shown in the form of a pin-type catch which is attached to the circular ring 9 arranged concentrically with the axis 8 of pointer 6, and moving synchronously with the pointer.

As ring 9 rotates, catch 7 meshes with the nearest slot 10 of the appropriate Maltese cross star wheel tooth and rotates it one step angularly. Thereby, dial 4, which is coupled to the Maltese cross arrangement 5, is also switched one angular step in the forward direction, causing the appearance of the next number in the associated aperture 3.

The embodiment shown is intended for a five-fold rotation of the pointer. Each excursion corresponds to 50 units on the scale, hence, there is a total range of 250 units. All numbered dials and the associate Maltese cross star wheel arrangement have six steps. Since the beginning and end of the scale coincide, the numbered dial located at this position carries the numbers 0, 50, 100, 150, 200, and 250. Similarly, the numbering on the other numbered dials differs by 50 units, with the numbering for each dal differing by steps of 10 units from dial to dial. In place of numbers exceeding 250, negative numbers occur in the various dials according to the principle explained in the following description.

If pointer 6 stands at zero, the number 0 appears at aperture 3a. In 3b, the adjacent aperture in the direction of the arrow P, appears the number 10, while aperture 3c shows the number 20. However, in the next aperture 3d we see the number —20, while aperture 3e contains the number —10. For this position of the pointer, catch pin 7 is located approximately midway between the Maltese cross star wheel arrangements for the numbered dials 4c and 4d. When pointer 6 moves in the direction of arrow P, pin 7 comes in contact with the Maltese cross star wheel of numbered dial 4d, and on further motion turns dial 4d one step in the direction of arrow Q. This causes the number 30 to replace the number —20 in opening 3d. The same sequence of events is repeated for dial 4e. When it rotates one step, the number —10 is replaced by the number 40. As pointer 6 continues its course, the associated rotation of ring 9 and pin 7 results in a change at aperture 3a from the number 0 to the number 50, at aperture 3b from the number 10 to the number 60, etc. In this manner, the switching of the dial marking as a function of the pointer rotation is accomplished at the position corresponding in each case to that opposite to the pointer tip.

In place of the negative numbers, considered in the example, blank spaces could be used, or such special markings as red areas to indicate end of range.

What I claim as new and desire to secure by Letters Patent of the United States is:

1. An indicating device comprising a stationary plate having a plurality of viewing apertures therethrough each at a different angular position about an axis, a member rotatable about said axis in proximity with said dial plate, a plurality of dials each having a circular array of different markings thereon and each disposed for rotation in proximity with a different one of said apertures to expose the different markings thereon through the apertures in accordance with the different angular positions thereof, and an intermittent-motion dial-swiching arrangement including drive means rotatable with said member, and a plurality of driven means each rotatable with a different one of said dials and disposed for intermittent driven engagement with said drive means, each of said driven means including a star wheel having a Maltese cross configuration in which the number of wheel teeth corresponds to the number of said different markings on the dial rotatable therewith and in which each of said teeth is slotted, and said drive means including a pin engageable with the slots in said driven means, whereby upon rotation and engagement of said pin with one of the slots of one of said driven means the markings on the dial rotatable therewith are changed abruptly in predetermined angular steps.

2. An indicating device comprising a stationary dial plate having markings thereon and a plurality of viewing apertures therethrough each at a different angular position about an axis, a member rotatable about said axis in proximity with said dial plate, a pointer rotatable with said rotatable member and having an end disposed to be viewed in relation to said markings on said dial plate, a plurality of dials each having a circular array of different markings thereon and each disposed for rotation in proximity with a different one of said apertures to expose the different markings thereon through the apertures in accordance with the different angular positions thereof, and an intermittent-motion dial-switching arrangement including drive means rotatable with said member, and a plurality of driven means each rotatable with a different one of said dials and disposed for intermittent driven engagement with said drive means, said drive means being disposed to engage each of said driven means at positions diametrically opposite to said end of said pointer.

3. An indicating device comprising a stationary dial plate having a plurality of viewing apertures therethrough each at a different angular position about an axis and further having graduations in a circular array, said apertures being disposed at predetermined angular positions near said graduations for indications of numerical values related to said graduations, a member rotatable about said axis proximity with said dial plate, a plurality of dials each having a circular array of different markings thereon and each disposed for rotation in proximity with a different one of said apertures to expose the different markings thereon through the apertures in accordance with the different angular positions thereof, said markings on said dials exposed through said apertures corresponding to the different numerical values related to said graduations and the exposed numerical markings on angularly-adjacent dials differing by numerical values related to numerical values of said graduations therebetween, a pointer rotatable with said rotatable member and having an end disposed to be viewed in relation to said graduations and the numerical markings on said dials exposed through said apertures, and an intermittent-motion dial-switching arrangement including drive means rotatable with said member, and a plurality of driven means each rotatable with a different one of said dials and disposed for intermittent driven engagement with said drive means, whereby the numerical markings exposed through said apertures characterize appropriate scale values during each of successive rotations of said pointer.

References Cited

UNITED STATES PATENTS

| 544,582 | 8/1895 | Isburgh | 235—113 |
|---|---|---|---|
| 561,702 | 6/1896 | Dorchester | 235—103 |
| 1,362,842 | 12/1920 | Brown | 116—129 |
| 1,473,493 | 11/1923 | Michetti | 74—436 |
| 3,030,016 | 4/1962 | Rudduck | 235—114 |
| 3,057,215 | 10/1962 | Stewart | 74—84 XR |
| 3,268,168 | 10/1966 | Staller et al. | 235—114 |

FOREIGN PATENTS 151,825   3/1932   Switzerland.

LOUIS J. CAPOZI, *Primary Examiner.*

U.S. Cl. X.R.

74—84, 436; 235—74, 83